United States Patent
Kimba Dit Adamou et al.

(10) Patent No.: US 12,389,289 B2
(45) Date of Patent: Aug. 12, 2025

(54) CAMPING METHOD, APPARATUS AND TERMINAL

(71) Applicant: VIVO MOBILE COMMUNICATION CO., LTD., Dongguan (CN)

(72) Inventors: Boubacar Kimba Dit Adamou, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 461 days.

(21) Appl. No.: 17/988,694

(22) Filed: Nov. 16, 2022

(65) Prior Publication Data

US 2023/0075381 A1 Mar. 9, 2023

Related U.S. Application Data

(63) Continuation of application No. PCT/CN2021/094242, filed on May 18, 2021.

(30) Foreign Application Priority Data

May 18, 2020 (CN) .......................... 202010421206.7

(51) Int. Cl.
*H04W 36/00* (2009.01)
*H04W 36/32* (2009.01)

(52) U.S. Cl.
CPC .. *H04W 36/00835* (2018.08); *H04W 36/0011* (2013.01); *H04W 36/322* (2023.05)

(58) Field of Classification Search
CPC ....... H04W 36/00835; H04W 36/0011; H04W 36/322; H04W 48/18; H04W 48/20; H04W 24/02

(Continued)

(56) References Cited

U.S. PATENT DOCUMENTS 8,121,602 B2 * 2/2012 Yi .......................... H04W 48/20
455/448
8,660,009 B2 * 2/2014 Dahlen ................. H04W 48/06
370/237

(Continued)

FOREIGN PATENT DOCUMENTS

CN 106550420 A 3/2017
CN 106879009 A 6/2017

(Continued)

OTHER PUBLICATIONS

First Office Action issued in related Chinese Application No. 202010421206.7, mailed Jan. 18, 2023, 6 pages.

(Continued)

*Primary Examiner* — Amancio Gonzalez
(74) *Attorney, Agent, or Firm* — IPX PLLC

(57) ABSTRACT

A camping method, an apparatus, and a terminal are provided. The method includes: executing a first event, where the first event includes the terminal moving from a first zone to a second zone, or the terminal switching from a first state to a second state; and when a first camping priority parameter of the terminal is inapplicable to the second zone or the second state, performing first camping in the second zone or the second state, where the first camping does not use the first camping priority parameter, and the first camping priority parameter includes: a camping priority parameter used by the terminal in the first zone, or a camping priority parameter used by the terminal in the first state.

20 Claims, 3 Drawing Sheets

(58) Field of Classification Search
USPC ........................................................ 455/436
See application file for complete search history.

(56) References Cited

U.S. PATENT DOCUMENTS

| | | | | |
|---|---|---|---|---|
| 8,706,115 | B2* | 4/2014 | Pani ..................... | H04W 48/20 |
| | | | | 455/436 |
| 8,780,775 | B2* | 7/2014 | Balasubramaniam ....................... | |
| | | | | H04W 52/0245 |
| | | | | 455/574 |
| 8,903,383 | B2* | 12/2014 | Farnsworth .......... | H04W 60/04 |
| | | | | 455/434 |
| 8,909,229 | B2* | 12/2014 | Martin ................ | H04W 36/249 |
| | | | | 370/335 |
| 8,923,228 | B2* | 12/2014 | Dalsgaard .............. | H04L 5/001 |
| | | | | 370/329 |
| 8,934,899 | B2* | 1/2015 | Hole ................. | H04W 36/0088 |
| | | | | 455/435.2 |
| 8,954,075 | B2* | 2/2015 | Paterson .............. | C07K 14/195 |
| | | | | 455/552.1 |
| 9,107,123 | B2* | 8/2015 | Wang ................ | H04W 36/0016 |
| 9,479,955 | B2* | 10/2016 | Vargas Bautista .......................... | |
| | | | | H04W 36/0094 |
| 9,485,630 | B2* | 11/2016 | Hwang ................. | H04W 72/30 |
| 9,730,147 | B2* | 8/2017 | Wirtanen .............. | H04W 48/18 |
| 10,470,196 | B2* | 11/2019 | Johansson ............ | H04W 48/16 |
| 10,555,323 | B2* | 2/2020 | Ma ........................ | H04L 5/0048 |
| 10,652,725 | B2* | 5/2020 | Siomina ................ | H04W 4/027 |
| 10,673,541 | B2* | 6/2020 | Nimmala ................ | H04B 1/10 |
| 10,813,019 | B2* | 10/2020 | Selvaganapathy ......................... | |
| | | | | H04W 36/0069 |
| 11,044,777 | B2* | 6/2021 | Hong .................. | H04L 41/0806 |
| 11,304,106 | B2* | 4/2022 | Wu ...................... | H04W 36/0072 |
| 11,375,426 | B2* | 6/2022 | Wu .................... | H04W 36/0061 |
| 11,483,896 | B2* | 10/2022 | Jin ........................ | H04L 5/0094 |
| 11,546,841 | B2* | 1/2023 | Rinne ............... | H04W 36/1443 |
| 11,582,661 | B2* | 2/2023 | Wang ................ | H04W 36/0094 |
| 11,582,714 | B2* | 2/2023 | Sang ................... | H04W 24/10 |
| 11,589,276 | B2* | 2/2023 | Shih ....................... | H04W 48/18 |
| 11,638,189 | B2* | 4/2023 | Youtz ................... | H04W 24/10 |
| | | | | 370/331 |
| 11,722,935 | B2* | 8/2023 | Tseng ................... | H04W 36/36 |
| | | | | 370/331 |
| 11,770,782 | B2* | 9/2023 | Lee ..................... | H04W 56/006 |
| | | | | 370/503 |
| 11,864,181 | B2* | 1/2024 | Hong .................... | H04L 5/0058 |
| 11,882,617 | B2* | 1/2024 | da Silva ................ | H04W 76/19 |
| 11,889,318 | B2* | 1/2024 | Zhu .................... | H04W 68/005 |
| 11,924,693 | B2* | 3/2024 | Da Silva ................ | H04W 76/10 |
| 11,974,181 | B2* | 4/2024 | Peng .................... | H04W 36/08 |
| 11,985,095 | B2* | 5/2024 | Lee ....................... | H04W 56/00 |
| 12,089,141 | B2* | 9/2024 | Fu ........................ | H04W 48/16 |
| 12,108,482 | B2* | 10/2024 | Hong .................. | H04W 28/0226 |
| 12,133,197 | B2* | 10/2024 | Lee ..................... | H04W 64/006 |
| 2010/0093350 | A1* | 4/2010 | Wang ................ | H04J 11/0086 |
| | | | | 455/436 |
| 2011/0317654 | A1* | 12/2011 | Ishida ................. | H04W 72/563 |
| | | | | 370/329 |
| 2012/0252452 | A1* | 10/2012 | Martin .................. | H04W 48/20 |
| | | | | 455/436 |
| 2013/0189987 | A1* | 7/2013 | Klingenbrunn .............................. | |
| | | | | H04W 36/00226 |
| | | | | 455/436 |
| 2014/0364079 | A1* | 12/2014 | DiFazio ................ | H04W 36/22 |
| | | | | 455/418 |
| 2015/0043418 | A1* | 2/2015 | Jang ...................... | H04L 65/611 |
| | | | | 370/312 |
| 2015/0271721 | A1* | 9/2015 | Venkatachari ....... | H04B 1/7087 |
| | | | | 455/434 |
| 2015/0327137 | A1* | 11/2015 | Zhang ................ | H04W 12/082 |
| | | | | 370/331 |
| 2016/0021673 | A1* | 1/2016 | Ahmadzadeh .......... | H04L 65/80 |
| | | | | 370/329 |
| 2017/0238221 | A1* | 8/2017 | Santhanam ....... | H04W 36/0085 |
| | | | | 370/331 |
| 2020/0280895 | A1* | 9/2020 | Jung ................... | H04W 36/249 |
| 2021/0337448 | A1* | 10/2021 | Youtz .................. | H04W 48/12 |
| 2022/0094481 | A1* | 3/2022 | Hong .................... | H04L 1/1812 |
| 2022/0191779 | A1* | 6/2022 | Bergqvist ............. | H04W 24/10 |
| 2022/0394608 | A1* | 12/2022 | Luo ....................... | H04W 60/00 |
| 2022/0400414 | A1* | 12/2022 | Bergström ............ | H04W 48/10 |
| 2023/0029004 | A1* | 1/2023 | Gao ..................... | H04W 48/12 |
| 2023/0062362 | A1* | 3/2023 | Sun ...................... | H04W 36/34 |
| 2023/0156546 | A1* | 5/2023 | Bergström ........ | H04W 36/0072 |
| | | | | 370/331 |
| 2023/0156583 | A1* | 5/2023 | Murray ................. | H04W 48/20 |
| | | | | 370/329 |

FOREIGN PATENT DOCUMENTS

| | | |
|---|---|---|
| CN | 108141801 A | 6/2018 |
| CN | 109151939 A | 1/2019 |
| CN | 109392034 A | 2/2019 |
| CN | 109769412 A | 5/2019 |
| WO | 2009045078 A2 | 4/2009 |
| WO | 2009057960 A2 | 5/2009 |
| WO | 2017214935 A1 | 12/2017 |
| WO | 2019051811 A1 | 3/2019 |

OTHER PUBLICATIONS

International Search Report issued in corresponding International Application No. PCT/CN2021/094242, mailed Jul. 23, 2021, 4 pages.
Extended European Search Report issued in related European Application No. 21809569.3, mailed Jul. 7, 2023, 13 pages.
Samsung, "Handling of deprioritisation information upon PLMN selection", 3GPP Draft; R2-130207, Jan. 2013, 2 pages.
Vivo, "cell reselection priority for Inactive Ue", 3GPP Draft, R2-1809865, Jul. 2018, 4 pages.
Itri, "Discussion on the dedicated priority for network slicing in cell reselection", 3GPP Draft, R2-1802152, Feb. 2018, 2 pages.
Second Office Action issued in related Chinese Application No. 202010421206.7, mailed Jun. 30, 2023, 10 pages.

* cited by examiner

CAMPING METHOD, APPARATUS AND TERMINAL

CROSS-REFERENCE TO RELATED APPLICATIONS

This application is a continuation of International Application No. PCT/CN2021/094242, filed May 18, 2021, which claims priority to Chinese Patent Application No. 202010421206.7, filed May 18, 2020. The entire contents of each of the above-referenced applications are expressly incorporated herein by reference.

TECHNICAL FIELD

This application relates to the field of communications technologies, and in particular, to a camping method, an apparatus, and a terminal.

BACKGROUND

In practical applications, a terminal may frequently move in different zones, such as moving from a first zone to a second zone, and also frequently switches in different states, such as switching from a first state to a second state. However, currently, after the terminal moves to a zone or switches a state, when the terminal performs camping, the terminal directly uses a camping configuration parameter before the moving or switching. This makes the camping of the terminal prone to errors, thereby affecting the performance of the terminal.

SUMMARY

Embodiments of this application provide a camping method, an apparatus, and a terminal.

According to a first aspect, an embodiment of this application provides a camping method, performed by a terminal and including:

executing a first event, where the first event includes the terminal moving from a first zone to a second zone, or the terminal switching from a first state to a second state; and if a first camping priority parameter of the terminal is inapplicable to the second zone or the second state, performing first camping in the second zone or the second state, where the first camping does not use the first camping priority parameter, and the first camping priority parameter includes: a camping priority parameter used by the terminal in the first zone, or a camping priority parameter used by the terminal in the first state.

According to a second aspect, an embodiment of this application provides a camping apparatus, including:

an execution module, configured to execute a first event, where the first event includes the terminal moving from a first zone to a second zone, or the terminal switching from a first state to a second state; and a first camping module, configured to, if a first camping priority parameter of the terminal is inapplicable to the second zone or the second state, perform first camping in the second zone or the second state, where the first camping does not use the first camping priority parameter, and the first camping priority parameter includes: a camping priority parameter used by the terminal in the first zone, or a camping priority parameter used by the terminal in the first state.

According to a third aspect, an embodiment of this application provides a terminal, including a memory, a processor, and a program or an instruction stored in the memory and capable of running on the processor, where when the program or the instruction is executed by the processor, the steps of the foregoing camping method provided in this application are implemented.

According to a fourth aspect, an embodiment of this application provides a readable storage medium, where the readable storage medium stores a program or an instruction, and when the program or the instruction is executed by a processor, the steps of the foregoing camping method provided in this application are implemented.

According to a fifth aspect, an embodiment of this application provides a chip, where the chip includes a processor and a communications interface, the communications interface is coupled to the processor, and the processor is configured to run a program or an instruction, to implement the steps of the camping method provided in this application.

According to a sixth aspect, an embodiment of this application provides a computer software product, where the computer software product is stored in a non-volatile storage medium, and the software product is configured to be executed by at least one processor, to implement the steps of the camping method provided in this application.

According to a seventh aspect, an embodiment of this application provides a terminal, where the terminal is configured to perform the camping method provided in this application.

In the embodiments of this application, the first event is executed, where the first event includes the terminal moving from the first zone to the second zone, or the terminal switching from the first state to the second state; and if the first camping priority parameter of the terminal is inapplicable to the second zone or the second state, the first camping is performed in the second zone or the second state, where the first camping does not use the first camping priority parameter, and the first camping priority parameter includes: a camping priority parameter used by the terminal in the first zone, or a camping priority parameter used by the terminal in the first state. In this way, after the terminal moves or switches, the terminal does not use the camping priority parameter that is inapplicable to the zone or the state after the switching, so as to avoid errors of the camping of the terminal, thereby improving the performance of the terminal.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "comprise/include" and any other variants in the description and the claims of this application mean to cover the non-exclusive inclusion, for example, a process, method, system, product, or device that includes a list of steps or units and is not necessarily limited to those steps or units, but may include other steps or units not expressly listed or inherent to such a process, method, product, or device. In addition, "and/or" used in the description and the claims means at least one of the connected objects. For example, A and/or B represent the following three cases: Only A exists, only B exists, and both A and B exist.

In the embodiments of this application, the word such as "example" or "for example" is used to represent giving an example, an illustration, or a description. Any embodiment or design scheme described as "an example of" or "for example" in the embodiments of this application should not be explained as being more preferred or having more advantages than another embodiment or design scheme. To be precise, the use of the term such as "exemplary" or "for example" is intended to present a related concept in a specific manner.

The following describes the embodiments of this application with reference to the accompanying drawings. A method for uplink transmission, an apparatus, and a terminal provided in the embodiments of this application may be performed by a wireless communications system. The wireless communications system may be a New Radio (NR) system, or other systems, such as an Evolved Long Term Evolution (eLTE) system or a Long Term Evolution (LTE) system, or a subsequent evolved communications system. Further, the method and the apparatus may be applied to an unlicensed band in the foregoing wireless communications system.

Figure 1:
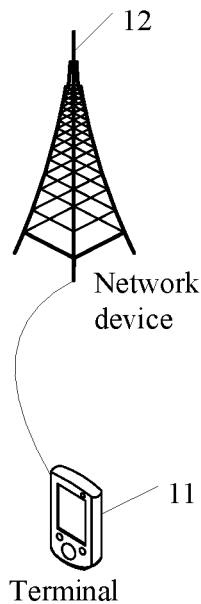
FIG. 1 is a structural diagram of a network system to which an embodiment of this application may be applied.

Referring to FIG. 1, FIG. 1 is a structural diagram of a network system to which an embodiment of this application may be applied. As shown in FIG. 1, the network system includes a terminal 11 and a network device 12. The terminal 11 may be a User Equipment (UE) or another terminal-side device, for example, a mobile phone, a tablet personal computer, a laptop computer, a personal digital assistant (PDA), a Mobile Internet Device (MID), a wearable device, and a robot. It should be noted that a specific type of the terminal 11 is not limited in the embodiments of this application. The network device 12 may be a $4^{th}$ Generation (4G) base station, a $5^{th}$ Generation (5G) base station, or a base station of a later version, or a base station in another communications system, or is referred to as a NodeB, or an evolved NodeB, or a Transmission Reception Point (TRP), or an Access Point (AP), or another term in the art, provided that a same technical effect is achieved. The network device is not limited to a specific technical term. In addition, the network device 12 may be a Master Node (MN) or a Secondary Node (SN). It should be noted that, in the embodiments of this application, the 5G base station is merely used as an example, but the network device is not limited to any specific type.

Figure 2:
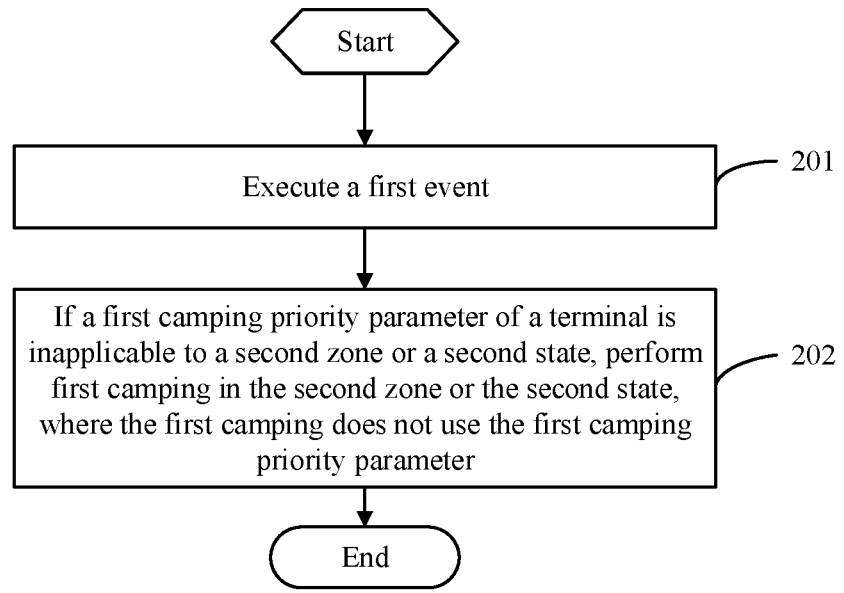
FIG. 2 is a flowchart of a camping method according to an embodiment of this application.

Referring to FIG. 2, FIG. 2 is a flowchart of a camping method according to an embodiment of this application. The method is performed by a terminal. As shown in FIG. 2, the method includes the following steps.

Step 201: Execute a first event, where the first event includes the terminal moving from a first zone to a second zone, or the terminal switching from a first state to a second state.

The terminal moving from a first zone to a second zone may be that the terminal moves in different location zones, different system zones, different device zones, or the like.

The terminal switching from a first state to a second state may be that the terminal switches between different states, for example, the terminal switches from an inactive state to an idle state.

Step 202: If a first camping priority parameter of the terminal is inapplicable to the second zone or the second state, perform first camping in the second zone or the second state, where the first camping does not use the first camping priority parameter, and the first camping priority parameter includes: a camping priority parameter used by the terminal in the first zone, or a camping priority parameter used by the terminal in the first state.

That the first camping priority parameter of the terminal is inapplicable to the second zone or the second state may be that a range in which the first camping priority parameter is applicable does not include the second zone or the second state. In addition, the first camping priority parameter may be configured for the terminal by a network side, for example, the first camping priority parameter is configured for the terminal in advance.

The camping priority parameter used by the terminal in the first zone may be that the first camping priority parameter is applicable to the first zone, and when the terminal is in the first zone, the terminal uses the camping priority parameter to perform camping.

The camping priority parameter used by the terminal in the first state may be that the first camping priority parameter is applicable to the first state, and when the terminal is in the first state, the terminal uses the camping priority parameter to perform camping.

If the first camping priority parameter of the terminal is inapplicable to the second zone or the second state, that the first camping is performed in the second zone or the second state may be that if the terminal moves from the first zone to the second zone, and the first camping priority parameter is inapplicable to the second zone, the first camping is performed in the second zone, and the first camping does not use the first camping priority parameter, or that if the terminal moves from the first zone to the second state, and the first camping priority parameter is inapplicable to the second state, the first camping is performed in the second state, and the first camping does not use the first camping priority parameter.

In this embodiment of this application, the zone and/or state to which the camping priority parameter is applicable is configured by a network or pre-agreed, for example, the zone and/or state to which the first camping priority parameter is applicable is configured by a network or pre-agreed. The foregoing configuration by a network may be configured through a dedicated message or a broadcast message. The foregoing pre-agreement may be agreed by a protocol, or agreed in advance by the terminal and a network device. In this embodiment of this application, this is not limited, for example, the camping priority parameter may carry indication information of the applicable zone and/or state.

In addition, the performing first camping in the second zone or the second state, where the first camping does not use the first camping priority parameter may be performing the first camping in the second zone or the second state by using another camping priority parameter, or performing camping without using a priority parameter, that is, normal camping.

The camping priority parameter in this embodiment of this application may include priorities of different network slices, for example, the first camping priority parameter indicates that a network slice 1 of the first zone is a first priority, and a slice 2 of the first zone is a second priority, or the first camping priority parameter indicates that a frequency (Fq) 1 of the first zone is the first priority, and a frequency (Fq) 2 of the first zone is the second priority. It should be noted that the specific content of the camping priority parameter is not limited in the embodiments of this application, for example, it may also be a priority of a cell, a network device, a Tracking Area (TA), a Radio Access Network (RAN), a Radio Access Technology (RAT) or a Public Land Mobile Network (PLMN).

In this embodiment of this application, the network slice may include a network slice of a RAN and/or a network slice of a core network.

In this embodiment of this application, the foregoing steps can implement that after the terminal moves or switches, the terminal does not use the camping priority parameter that is inapplicable to the zone or the state after the switching, so as to avoid errors of the camping of the terminal and improve performance of the terminal.

In an exemplary implementation, after the executing a first event, the method further includes:

if the first camping priority parameter of the terminal is inapplicable to the second zone or the second state, deleting the first camping priority parameter.

The deleting the first camping priority parameter may include that the terminal deletes the first camping priority parameter; or the deleting the first camping priority parameter may include that the terminal, based on a priority parameter deletion configuration configured in advance by a network, deletes the first camping priority parameter.

That the terminal deletes the first camping priority parameter may be that the terminal does not perform deletion based on the network configuration, for example, the terminal can select a to-be-deleted camping priority parameter. That the terminal, based on a priority parameter deletion configuration configured in advance by a network, deletes the first camping priority parameter may be that the network side configures the terminal with a configuration for deleting priority parameter, and the terminal deletes the camping priority parameter based on this configuration.

In this implementation, because the first camping priority parameter is deleted, a storage space of the terminal can be saved. Complexity of the camping of the terminal may further be reduced, because it can be determined whether the camping priority parameter is applicable.

For example, the terminal performs camping in the first zone or in the first state (for example, INACTIVE or Idle) based on the camping priority parameter configured by the network. When the terminal moves to a new zone or the terminal changes a state, for example, the terminal moves to the second zone or switches to the second state, the terminal determines whether the camping priority parameter is applicable to the second zone or the second state. If the camping priority parameter is inapplicable to the second zone or the second state, the terminal deletes the camping priority parameter, and if no priority parameter is configured for the terminal in the second zone or the second state, the terminal uses normal camping.

In an exemplary implementation, the performing first camping in the second zone or the second state includes:

in a case that the terminal is configured with a second camping priority parameter, using the second camping priority parameter to perform the first camping in the second zone or the second state; or in a case that the terminal is not configured with the second camping priority parameter, performing the first camping in the second zone or the second state, where the first camping is normal camping without using a camping priority parameter.

The second camping priority parameter is a camping priority parameter applicable to the second zone or the second state.

A zone and/or a state to which the second camping priority parameter is applicable is configured by the network or pre-agreed. In addition, the second camping priority parameter may be configured in advance by the network for the terminal.

The foregoing normal camping without using a camping priority parameter means that the camping priority parameter is not used during a process of the camping. The camping is called normal camping. The camping may be performed based on a measurement result, for example, the camping may be performed based on a measurement result of an inter-frequency network frequency and/or a heterogeneous network frequency.

In some embodiments, the camping may be performed based on a camping criterion of a protocol agreement, for example, the camping may be performed based on an S criterion of the protocol agreement.

In an exemplary implementation, the first zone and the second state are one of the following:

different cells;

coverage zones of different network devices;

zones of different (TAs);

zones of different (RANs);

zones of different (RATs); or zones of different (PLMNs).

The different cells may mean that the first zone and the second zone are zones in the different cells. The coverage zones of different network devices may mean that the first zone and the second zone are zones of the different network devices. The zones of different TAs may mean that the first zone and the second zone are zones of the different TAs. The zones of different RANs may mean that the first zone and the second zone are zones of the different RANs. The zones of different radio access technologies may mean that the first zone and the second zone are zones of the different RATs, for example, the first zone is a network zone in LTE, while the second zone is a network zone in NR or a network zone in a WLAN, and it may be understood that network types of the first zone and the second zone are different. The zones of different PLMNs may mean that the first zone and the second zone are zones of the different PLMNs.

For example, in a certain zone of a network, the camping priority parameter configured by the network for the terminal includes:

a first camping priority parameter: a slice 1 in the first zone is a first priority, and a slice 2 is a second priority; and a second camping priority parameter: a slice 2 in the second zone is the first priority, and the slice 1 is the second priority.

The slice may include a RAN slice and/or a core network slice.

Levels of the zones may include:

a cell, a base station, a TA, a RAN, a RAT, or a PLMN.

The terminal performs camping in the first zone based on a slice camping priority parameter configured by the network. When the terminal moves to a new zone, for example, the second zone, the terminal determines whether the slice priority parameter is applicable to the second zone.

If the priority parameter is inapplicable to the second zone, the terminal deletes the priority parameter. If the priority parameter is not configured for the terminal in the second zone, the terminal uses the normal camping.

In an exemplary implementation, the switching from a first state to a second state includes one of the following:
 switching from an inactive state to an idle state;
 switching from a connected state to an idle state;
 switching from a connected state to an inactive state; or
 switching from an idle state to an inactive state.

In this implementation, using inapplicable camping priority parameters can be avoided when switching states.

In an exemplary implementation, the camping priority parameter used by the terminal in the first zone includes:
 a camping priority of at least one network slice; and
 a camping priority of at least one frequency.

Further, in this implementation, the priority parameter may be configured using network handover or a frequency as a unit.

The following is an example in which the priority parameter is configured using a frequency as a unit (that is, Per frequency).

In a certain zone of the network, the network configures a camping priority for the terminal, for example:
 a first camping priority parameter: an Fq 1 in a first zone 1 is a first priority, and an Fq 2 is a second priority; and
 a second camping priority parameter: an Fq 2 in the second zone is the first priority, and the Fq 1 is the second priority.

Level of the zones may include a TA, a RAN, a RAT or a PLMN.

The camping is performed in the first zone based on an Fq camping priority parameter configured by the network. When the terminal moves to a new zone, for example, the second zone, the terminal determines whether the Fq priority parameter is applicable to the second zone. If the priority parameter is inapplicable to the second zone, the terminal deletes the priority parameter. If the priority parameter is not configured for the terminal in the second zone, the terminal uses the normal camping.

In an exemplary implementation, the camping priority parameter used by the terminal in the first state includes at least one of the following:
 a camping priority of at least one object; or
 a camping priority of at least one frequency.
 The foregoing objects may include at least one of the following:
 a network slice, a cell, a network device, a TA, a RAN, a RAT, or a PLMN.

In this way, the camping priority may be configured for the network slice, the cell, the network device, the TA, the RAN, the RAT, and the PLMN. A camping priority of the TA may be a camping priority of a Tracking Area Code (TAC), because different TAs may be identified by the TAC.

In an exemplary implementation, the first event includes the terminal switching from the first state to the second state, where the terminal switching from the first state to the second state includes that when moving from the first zone to the second zone, the terminal switches from the first state to the second state, and the method further includes:
 if a third camping priority parameter of the terminal is applicable to the second state, but inapplicable to the second zone, performing second camping in the second state, where the second camping does not use the third camping priority parameter.

This implementation can determine whether the camping priority parameter is applicable to the corresponding state and zone separately if there is movement between zones when the state is switched. If the state is applicable, but the zone is inapplicable, the camping priority parameter is not used. If the third camping priority parameter of the terminal is applicable to the second state and the second zone, the camping is performed in the second state based on the third camping priority parameter.

For example, in a certain zone of the network, the network configures a state camping priority parameter for the terminal. The state camping priority parameter may include a state camping priority parameter of a network slice, a cell, a base station, a TAC, a RAN, a RAT, or a PLMN.

When a parameter of a state camping priority is configured by the network, the terminal enters an INACTIVE state or an Idle state, and the terminal camps on a zone designated based on the state camping priority parameter. For example, the state camping priority parameter includes:
 a first camping priority parameter: when the terminal enters the INACTIVE state, a slice 1 is a first priority, and a slice 2 is a second priority; and
 a first camping priority parameter: when the terminal enters the Idle state, the slice 2 is the first priority, and the slice 1 is the second priority.

The terminal enters the Idle or INACTIVE state based on the state camping priority parameter configured by the network.

When the terminal moves to a new zone, for example, the second zone, the terminal determines whether the state priority parameter is applicable to the second zone 2.

In some embodiments, when the terminal switches from the INACTIVE state to the Idle state, the terminal determines whether the state camping priority parameter is applicable.

If the state camping priority parameter is inapplicable to the Idle state, the terminal deletes the priority parameter.

If the priority parameter is not configured for the terminal in the second zone, the terminal uses the normal camping.

In an exemplary implementation, the first event includes the terminal moving from a first zone to a second zone, where the terminal moving from a first zone to a second zone includes that: when switching from the first state to the second state, the terminal moves from the first zone to the second zone, and the method further includes:
 if a fourth camping priority parameter of the terminal is applicable to the second zone, but inapplicable to the second state, performing third camping in the second zone, where the third camping does not use the fourth camping priority parameter.

In this implementation, when the camping priority parameter is applicable to the second zone, but inapplicable to the second state, the camping priority parameter is not used, thereby avoiding errors of the camping.

In an exemplary implementation, after the executing a first event, the method further includes:
 if a network broadcast indicates that the second zone or the second state supports a fifth camping priority parameter, performing camping by using the fifth camping priority parameter in the second zone or the second state.

The fifth camping priority parameter may be a special camping priority parameter, for example, a special frequency camping priority parameter. The foregoing network indication may be an indication by the network through a broadcast message. For example, the network indicates whether this zone supports use of a special frequency priority parameter through a broadcast message. If so, the terminal continues to use the special frequency priority parameter when the terminal reselects this cell.

Further, the fifth camping priority parameter may also be applicable to the first zone or the first state, for example, the network broadcasts in the first cell indicating that the fifth camping priority parameter is supported.

If the network broadcasts that the fifth camping priority parameter is not supported, the fifth camping priority parameter is not used to perform camping.

In this implementation, because the network only needs to broadcast whether to support the fifth camping priority parameter, thereby saving signaling overhead. Further, the fifth camping priority parameter may be configured in advance for the terminal, or may be a special camping priority parameter is agreed in advance by a protocol.

In this embodiment of this application, the first event is executed, where the first event includes the terminal moving from the first zone to the second zone, or the terminal switching from the first state to the second state; and if the first camping priority parameter of the terminal is inapplicable to the second zone or the second state, the first camping in the second zone or the second state is performed, where the first camping does not use the first camping priority parameter, and the first camping priority parameter includes: a camping priority parameter used by the terminal in the first zone, or a camping priority parameter used by the terminal in the first state. In this way, after the terminal moves or switches, the terminal does not use the camping priority parameter that is inapplicable to the zone or the state after the switching, so as to avoid errors of the camping of the terminal, thereby improving the performance of the terminal.

Figure 3:
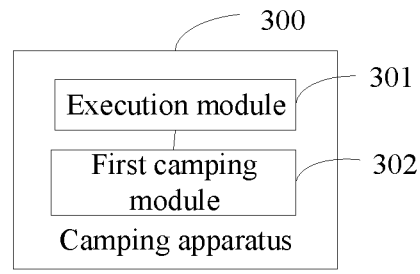
FIG. 3 is a structural diagram of a camping apparatus according to an embodiment of this application.

Referring to FIG. 3, FIG. 3 is a structural diagram of a camping apparatus applied to a terminal according to an embodiment of this application. As shown in FIG. 3, the camping apparatus 300 includes:
- an execution module 301, configured to execute a first event, where the first event includes the terminal moving from a first zone to a second zone, or the terminal switching from a first state to a second state; and
- a first camping module 302, configured to, if a first camping priority parameter of the terminal is inapplicable to the second zone or the second state, perform first camping in the second zone or the second state, where the first camping does not use the first camping priority parameter, and the first camping priority parameter includes: a camping priority parameter used by the terminal in the first zone, or a camping priority parameter used by the terminal in the first state.

Figure 4:
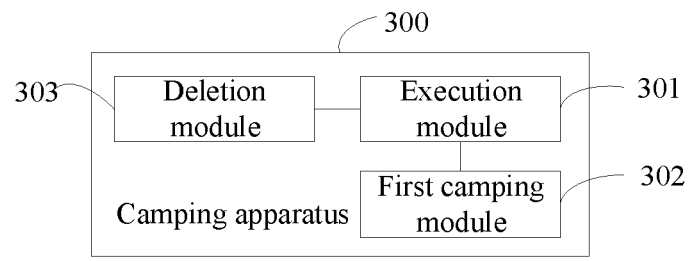
FIG. 4 is a structural diagram of another camping apparatus according to an embodiment of this application.

In some embodiments, as shown in FIG. 4, the apparatus further includes:
- a deletion module 303, configured to, if the first camping priority parameter of the terminal is inapplicable to the second zone or the second state, delete the first camping priority parameter.

In some embodiments, the deleting the first camping priority parameter includes:
that the terminal deletes the first camping priority parameter; or
that the terminal, based on a priority parameter deletion configuration configured in advance by a network, deletes the first camping priority parameter.

In some embodiments, the performing first camping in the second zone or the second state includes:
in a case that the terminal is configured with a second camping priority parameter, using the second camping priority parameter to perform the first camping in the second zone or the second state; or
in a case that the terminal is not configured with a second camping priority parameter, performing the first camping in the second zone or the second state, where the first camping is normal camping without using a camping priority parameter.

The second camping priority parameter is a camping priority parameter applicable to the second zone or the second state.

In some embodiments, the first zone and the second zone are one of the following:
different cells;
coverage zones of different network devices;
zones of different tracking areas TAs;
zones of different radio access networks RANs;
zones of different radio access technologies; or
zones of different public land mobile networks PLMNs.

In some embodiments, the switching from a first state to a second state includes one of the following:
switching from an inactive state to an idle state;
switching from a connected state to an idle state;
switching from a connected state to an inactive state; or
switching from an idle state to an inactive state.

In some embodiments, the camping priority parameter used by the terminal in the first zone includes at least one of the following:
a camping priority of at least one network slice; or
a camping priority of at least one frequency.

In some embodiments, the camping priority parameter used by the terminal in the first state includes at least one of the following:
a camping priority of at least one object; or
a camping priority of at least one frequency.

In some embodiments, the object includes at least one of the following:
a network slice, a cell, a network device, a TA, a RAN, a RAT, or a PLMN.

Figure 5:
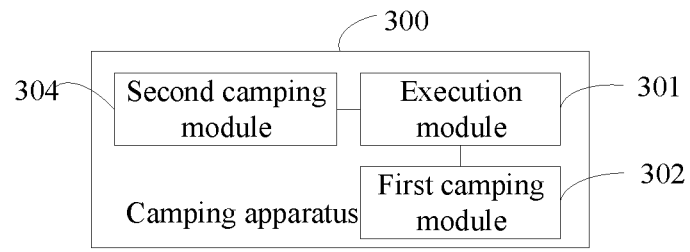
FIG. 5 is a structural diagram of another camping apparatus according to an embodiment of this application.

In some embodiments, the first event includes the terminal switching from a first state to a second state, where the terminal switching from a first state to a second state includes that when moving from the first zone to the second zone, the terminal switches from the first state to the second state. As shown in FIG. 5, the apparatus further includes:
- a second camping module 304, configured to, if a third camping priority parameter of the terminal is applicable to the second state, but inapplicable to the second zone, perform second camping in the second state, where the second camping does not use the third camping priority parameter.

Figure 6:
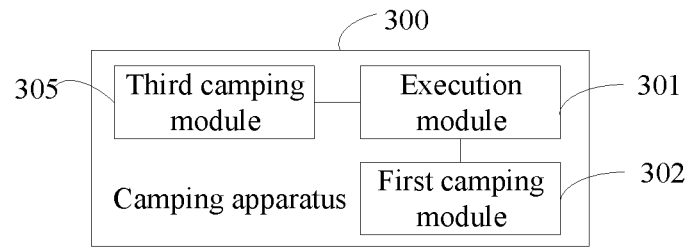
FIG. 6 is a structural diagram of another camping apparatus according to an embodiment of this application.

In some embodiments, the first event includes the terminal moving from a first zone to a second zone, where the terminal moving from a first zone to a second zone includes that when switching from the first state to the second state, the terminal moves from the first zone to the second zone. As shown in FIG. 6, the apparatus further includes:
- a third camping module 305, configured to, if a fourth camping priority parameter of the terminal is applicable to the second zone, but inapplicable to the second state, perform third camping in the second zone, where the third camping does not use the fourth camping priority parameter.

In some embodiments, a zone and/or a state to which the first camping priority parameter is applicable is configured by a network or pre-agreed.

Figure 7:
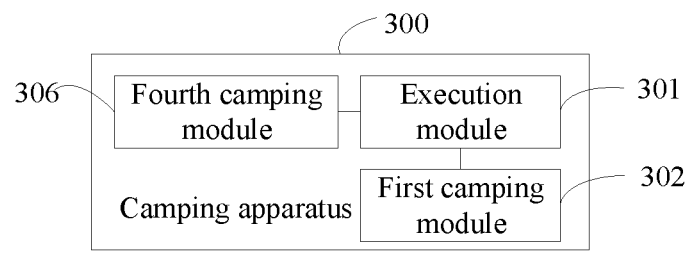
FIG. 7 is a structural diagram of another camping apparatus according to an embodiment of this application.

In some embodiments, after executing a first event, as shown in FIG. 7, the apparatus further includes:

a fourth camping module 306, configured to, if a network broadcast indicates that the second zone or the second state supports a fifth camping priority parameter, perform camping by using the fifth camping priority parameter in the second zone or the second state.

An information obtaining apparatus provided in this embodiment of this application can implement the processes implemented in the method embodiment in FIG. 2, thereby improving performance of the terminal. To avoid repetition, details are not described herein again.

It should be noted that the camping apparatus in this embodiment of this application may be an apparatus, or may be a component, an integrated circuit, or a chip in a terminal.

Figure 8:
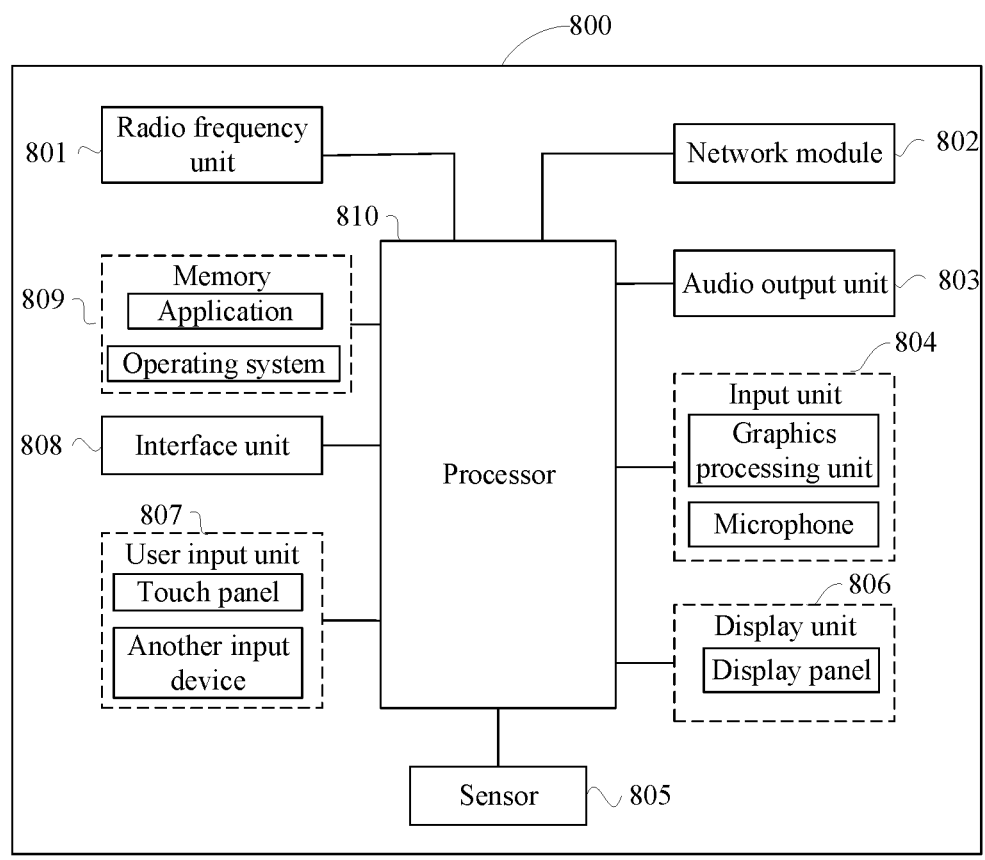
FIG. 8 is a structural diagram of a terminal according to an embodiment of this application.

FIG. 8 is a schematic diagram of a hardware structure of a terminal according to an embodiment of this application.

The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

Persons skilled in the art can understand that the terminal 800 may further include a power supply (for example, a battery) that supplies power to the components. The power supply may be logically connected to the processor 810 through a power management system, so as to implement functions such as charging management, discharging management, and power consumption management through the power management system. A structure of the electronic device shown in FIG. 8 does not constitute a limitation on the electronic device, and may include more or fewer parts than those shown in the figure, or combine some components, or have different part arrangements. Details are not described herein again.

The radio frequency unit 801 or the processor 810 is configured to execute a first event, where the first event includes the terminal moving from a first zone to a second zone, or the terminal switching from a first state to a second state.

The radio frequency unit 801 is configured to, if a first camping priority parameter of the terminal is inapplicable to the second zone or the second state, perform first camping in the second zone or the second state, where the first camping does not use the first camping priority parameter, and the first camping priority parameter includes: a camping priority parameter used by the terminal in the first zone, or a camping priority parameter used by the terminal in the first state.

In some embodiments, after the executing a first event, the radio frequency unit 801 or the processor 810 is further configured to:

if the first camping priority parameter of the terminal is inapplicable to the second zone or the second state, delete the first camping priority parameter.

In some embodiments, the deleting the first camping priority parameter includes:

that the terminal deletes the first camping priority parameter; or that the terminal, based on a priority parameter deletion configuration configured in advance by a network, deletes the first camping priority parameter.

In some embodiments, the performing first camping in the second zone or the second state includes:

in a case that the terminal is configured with a second camping priority parameter, using the second camping priority parameter to perform the first camping in the second zone or the second state; or in a case that the terminal is not configured with a second camping priority parameter, performing the first camping in the second zone or the second state, where the first camping is normal camping without using a camping priority parameter.

The second camping priority parameter is a camping priority parameter applicable to the second zone or the second state.

In some embodiments, the first zone and the second zone are one of the following:

different cells;

coverage zones of different network devices;

zones of different tracking areas TAs;

zones of different radio access networks RANs;

zones of different radio access technologies; or zones of different public land mobile networks PLMNs.

In some embodiments, the switching from a first state to a second state includes one of the following:

switching from an inactive state to an idle state;

switching from a connected state to an idle state;

switching from a connected state to an inactive state; or switching from an idle state to an inactive state.

In some embodiments, the camping priority parameter used by the terminal in the first zone includes at least one of the following:

a camping priority of at least one network slice; or a camping priority of at least one frequency.

In some embodiments, the camping priority parameter used by the terminal in the first state includes at least one of the following:

a camping priority of at least one object; or a camping priority of at least one frequency.

In some embodiments, the object includes at least one of the following:

a network slice, a cell, a network device, a TA, a RAN, a RAT, or a PLMN.

In some embodiments, the first event includes the terminal switching from a first state to a second state, where the terminal switching from a first state to a second state includes that when moving from the first zone to the second zone, the terminal switches from the first state to the second state. The radio frequency unit 801 is further configured to:

if a third camping priority parameter of the terminal is applicable to the second state, but inapplicable to the second zone, perform second camping in the second state, where the second camping does not use the third camping priority parameter.

In some embodiments, the first event includes the terminal moving from a first zone to a second zone, where the terminal moving from a first zone to a second zone includes that when switching from the first state to the second state, the terminal moves from the first zone to the second zone. The radio frequency unit 801 is further configured to:

if a fourth camping priority parameter of the terminal is applicable to the second zone, but inapplicable to the second state, perform third camping in the second zone, where the third camping does not use the fourth camping priority parameter.

In some embodiments, a zone and/or a state to which the first camping priority parameter is applicable is configured by a network or pre-agreed.

In some embodiments, after the executing a first event, the radio frequency unit 801 is further configured to:

if a network broadcast indicates that the second zone or the second state supports a fifth camping priority parameter, perform camping by using the fifth camping priority parameter in the second zone or the second state.

The foregoing terminal can improve the performance of the terminal.

In some embodiments, an embodiment of this application further provides a terminal, including a processor 810, a memory 809, and a program or an instruction stored in the memory 809 and capable of running on the processor 810. When the program or the instruction is executed by the processor 810, the processes of the foregoing camping method embodiments are implemented, with the same technical effects achieved. To avoid repetition, details are not described herein again.

An embodiment of this application further provides a readable storage medium, where the readable storage medium stores a program or an instruction, and when the program or the instruction is executed by a processor, the procedures of the foregoing camping method embodiments are implemented, with the same technical effects. To avoid repetition, details are not described herein.

The processor is the processor in the terminal or network device described in the foregoing embodiment. The readable storage medium includes a computer-readable storage medium such as a computer Read-Only Memory (ROM), a Random Access Memory (RAM), a magnetic disk, or an optical disc.

An embodiment of this application also provides a chip. The chip includes a processor and a communications interface, and the communications interface is coupled to the processor. The processor is configured to run a program or an instruction to implement various processes of the foregoing camping method embodiment, with the same technical effects achieved. To avoid repetition, details are not described herein again.

It should be understood that the chip mentioned in this embodiment of this application may also be referred to as a system-level chip, a system chip, a system on chip, a system-on-a-chip chip, and the like.

It should be noted that, in this specification, the terms "include", "comprise", or any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods for each particular application to implement the described functions, but such implementation shall not be considered to be outside the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each unit may exist separately physically, or two or more units may be integrated into one unit.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

A person of ordinary skill in the art may understand that all or some of the processes in the methods in the foregoing embodiments may be implemented by using a computer program to control related hardware. The program may be stored in a computer readable storage medium. When the program is executed, the processes in the foregoing methods embodiments may be performed. The foregoing storage medium may be a magnetic disc, an optical disc, a Read-Only Memory (ROM), a Random Access Memory (RAM), or the like.

It may be understood that the embodiments described in the embodiments of the present disclosure may be implemented by hardware, software, firmware, middleware, microcode, or a combination thereof. For implementation with hardware, modules, units, and subunits may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions of the present disclosure, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A camping method, performed by a terminal, comprising:
   executing a first event, wherein the first event comprises the terminal moving from a first zone to a second zone, or the terminal switching from a first state to a second state; and
   when a first camping priority parameter of the terminal is inapplicable to the second zone or the second state, performing first camping in the second zone or the second state, wherein
      the first camping does not use the first camping priority parameter; and
      the first camping priority parameter comprises: a camping priority parameter used by the terminal in the first zone, or a camping priority parameter used by the terminal in the first state.

2. The camping method according to claim 1, wherein after the executing a first event, the method further comprises:
   when the first camping priority parameter of the terminal is inapplicable to the second zone or the second state, deleting the first camping priority parameter.

3. The camping method according to claim 2, wherein the deleting the first camping priority parameter comprises:
   deleting the first camping priority parameter by the terminal; or
   based on a priority parameter deletion configuration configured in advance by a network, deleting the first camping priority parameter by the terminal.

4. The camping method according to claim 1, wherein the performing first camping in the second zone or the second state comprises:
   in a case that the terminal is configured with a second camping priority parameter, using the second camping priority parameter to perform the first camping in the second zone or the second state; or
   in a case that the terminal is not configured with a second camping priority parameter, performing the first camping in the second zone or the second state, wherein the first camping is normal camping without using a camping priority parameter; and
      the second camping priority parameter is a camping priority parameter applicable to the second zone or the second state.

5. The camping method according to claim 1, wherein the first zone and the second zone are one of the following:
   different cells;
   coverage zones of different network devices;
   zones of different tracking areas (TAs);
   zones of different radio access networks (RANs);
   zones of different radio access technologies;
   zones of different public land mobile networks (PLMNs).

6. The camping method according to claim 1, wherein the switching from a first state to a second state comprises one of the following:
   switching from an inactive state to an idle state;
   switching from a connected state to an idle state;
   switching from a connected state to an inactive state; or
   switching from an idle state to an inactive state.

7. The camping method according to claim 1, wherein the camping priority parameter used by the terminal in the first zone comprises at least one of the following:
   a camping priority of at least one network slice; or
   a camping priority of at least one frequency.

8. The camping method according to claim 1, wherein the camping priority parameter used by the terminal in the first state comprises at least one of the following:
   a camping priority of at least one object; or
   a camping priority of at least one frequency.

9. The camping method according to claim 8, wherein the object comprises at least one of the following:
   a network slice, a cell, a network device, a TA, a RAN, a RAT, or a PLMN.

10. The camping method according to claim 1, wherein the first event comprises the terminal switching from a first state to a second state, the terminal switching from a first state to a second state comprises that when moving from the first zone to the second zone, the terminal switches from the first state to the second state, and the method further comprises:
    when a third camping priority parameter of the terminal is applicable to the second state, but inapplicable to the second zone, performing second camping in the second state, wherein the second camping does not use the third camping priority parameter.

11. The camping method according to claim 1, wherein the first event comprises the terminal moving from a first zone to a second zone, wherein the terminal moving from a first zone to a second zone comprises that when switching from the first state to the second state, the terminal moves from the first zone to the second zone, and the method further comprises:
    when a fourth camping priority parameter of the terminal is applicable to the second zone, but inapplicable to the second state, performing third camping in the second zone, wherein the third camping does not use the fourth camping priority parameter.

12. The camping method according to claim 1, wherein a zone or a state to which the first camping priority parameter is applicable is configured by a network or pre-agreed.

13. The camping method according to claim 1, wherein after the executing a first event, the method further comprises:
    when a network broadcast indicates that the second zone or the second state supports a fifth camping priority parameter, performing camping by using the fifth camping priority parameter in the second zone or the second state.

14. A terminal, comprising: a memory storing a computer program; and a processor coupled to the memory and configured to execute the computer program to perform operations comprising:
- executing a first event, wherein the first event comprises the terminal moving from a first zone to a second zone, or the terminal switching from a first state to a second state; and
- when a first camping priority parameter of the terminal is inapplicable to the second zone or the second state, performing first camping in the second zone or the second state, wherein
  - the first camping does not use the first camping priority parameter; and
  - the first camping priority parameter comprises: a camping priority parameter used by the terminal in the first zone, or a camping priority parameter used by the terminal in the first state.

15. The terminal according to claim 14, wherein after the executing a first event, the method further comprises:
- when the first camping priority parameter of the terminal is inapplicable to the second zone or the second state, deleting the first camping priority parameter.

16. The terminal according to claim 15, wherein the deleting the first camping priority parameter comprises:
- deleting the first camping priority parameter by the terminal; or
- based on a priority parameter deletion configuration configured in advance by a network, deleting the first camping priority parameter by the terminal.

17. The terminal according to claim 14, wherein the performing first camping in the second zone or the second state comprises:
- in a case that the terminal is configured with a second camping priority parameter, using the second camping priority parameter to perform the first camping in the second zone or the second state; or
- in a case that the terminal is not configured with a second camping priority parameter, performing the first camping in the second zone or the second state, wherein
  - the first camping is normal camping without using a camping priority parameter; and
  - the second camping priority parameter is a camping priority parameter applicable to the second zone or the second state.

18. A non-transitory computer-readable storage medium, storing a computer program, when the computer program is executed by a processor, causes the processor to perform operations comprising:
- executing a first event, wherein the first event comprises the terminal moving from a first zone to a second zone, or the terminal switching from a first state to a second state; and
- when a first camping priority parameter of the terminal is inapplicable to the second zone or the second state, performing first camping in the second zone or the second state, wherein
  - the first camping does not use the first camping priority parameter; and
  - the first camping priority parameter comprises: a camping priority parameter used by the terminal in the first zone, or a camping priority parameter used by the terminal in the first state.

19. The non-transitory computer-readable storage medium according to claim 18, wherein after the executing a first event, the method further comprises:
- when the first camping priority parameter of the terminal is inapplicable to the second zone or the second state, deleting the first camping priority parameter.

20. The non-transitory computer-readable storage medium according to claim 19, wherein the deleting the first camping priority parameter comprises:
- deleting the first camping priority parameter by the terminal; or
- based on a priority parameter deletion configuration configured in advance by a network, deleting the first camping priority parameter by the terminal.

* * * * *